United States Patent
Liu et al.

(10) Patent No.: US 12,532,228 B2
(45) Date of Patent: Jan. 20, 2026

(54) STATE NOTIFICATION METHOD, DEVICE, AND SYSTEM

(71) Applicant: VIVO MOBILE COMMUNICATION CO., LTD., Dongguan (CN)

(72) Inventors: Xuanbing Liu, Dongguan (CN); Wei Bao, Dongguan (CN); Xiaodong Yang, Dongguan (CN); Wenjuan Pu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 503 days.

(21) Appl. No.: 17/968,785

(22) Filed: Oct. 18, 2022

(65) Prior Publication Data
US 2023/0045093 A1    Feb. 9, 2023

Related U.S. Application Data

(63) Continuation of application No. PCT/CN2021/087851, filed on Apr. 16, 2021.

(30) Foreign Application Priority Data

Apr. 20, 2020   (CN) .......................... 202010313572.0

(51) Int. Cl.
*H04W 36/00*    (2009.01)
*H04W 88/06*    (2009.01)

(52) U.S. Cl.
CPC ........ *H04W 36/0011* (2013.01); *H04W 88/06* (2013.01)

(58) Field of Classification Search
CPC ......... H04W 4/02; H04W 8/08; H04W 24/02; H04W 48/18; H04W 60/04; H04W 36/0011

(Continued)

(56) References Cited

U.S. PATENT DOCUMENTS

| 7,219,343 | B2 * | 5/2007 | Almeida | ................. | H04L 67/34 |
| | | | | | 709/215 |
| 8,904,374 | B2 * | 12/2014 | Nakamura | ................. | G06F 8/66 |
| | | | | | 717/169 |

(Continued)

FOREIGN PATENT DOCUMENTS

| CN | 101932058 A | 12/2010 |
| CN | 103369673 A | 10/2013 |

(Continued)

OTHER PUBLICATIONS

T. Ivankovic, "Support of multimedia broadcast/multicast service in UMTS networks," Proceedings of the 8th International Conference on Telecommunications, 2005. ConTEL 2005., Zagreb, Croatia, 2005, pp. 91-98, doi: 10.1109/CONTEL.2005.185827 (Year: 2005).*

(Continued)

*Primary Examiner* — William D Cumming
(74) *Attorney, Agent, or Firm* — IPX PLLC

(57) ABSTRACT

A state notification method, a device, and a system are provided. The state notification method includes: before the first UE leaves a first network on which the first UE camps, determining, according to leaving notification configuration information, whether to send a leaving notification message; and when determining to send a leaving notification message, sending a leaving notification message to a first network device. The leaving notification message is used to indicate that the first UE will leave the first network, and the first network is a network in which the first network device is located.

18 Claims, 6 Drawing Sheets

(58) Field of Classification Search
USPC .................................................. 455/456.1
See application file for complete search history.

(56) References Cited

U.S. PATENT DOCUMENTS

| | | | | |
|---|---|---|---|---|
| 10,484,967 | B2 * | 11/2019 | Liu | H04W 48/18 |
| 10,542,515 | B2 * | 1/2020 | Li | H04W 8/08 |
| 11,189,119 | B2 * | 11/2021 | Jarugumilli | H04B 17/318 |
| 2004/0205779 | A1 * | 10/2004 | Almeida | H04L 67/34 |
| | | | | 719/321 |
| 2006/0036733 | A1 * | 2/2006 | Fujimoto | H04L 63/08 |
| | | | | 709/225 |
| 2011/0179408 | A1 * | 7/2011 | Nakamura | G06F 8/66 |
| | | | | 717/170 |
| 2015/0056998 | A1 | 2/2015 | Kaikkonen et al. | |
| 2016/0323156 | A1 * | 11/2016 | Zakaria | H04B 17/318 |
| 2018/0041984 | A1 * | 2/2018 | Li | H04W 8/08 |
| 2019/0174458 | A1 * | 6/2019 | Liu | H04W 48/18 |
| 2021/0019966 | A1 * | 1/2021 | Jarugumilli | G07C 9/00571 |
| 2023/0045093 | A1 * | 2/2023 | Liu | H04W 36/0011 |
| 2023/0148189 | A1 * | 5/2023 | Lee | H04W 76/28 |
| | | | | 455/456.1 |

FOREIGN PATENT DOCUMENTS

| | | | | |
|---|---|---|---|---|
| CN | 115299127 | A * | 11/2022 | H04W 24/10 |
| EP | 3477976 | A1 | 5/2019 | |
| EP | 4120755 | A1 * | 1/2023 | H04W 76/28 |
| EP | 4142338 | A1 * | 3/2023 | H04W 36/0011 |
| KR | 2020025667 | A * | 3/2020 | H04L 12/44 |
| WO | 2018014283 | A1 | 1/2018 | |
| WO | WO-2021187893 | A1 * | 9/2021 | H04W 76/28 |
| WO | WO-2021213279 | A1 * | 10/2021 | H04W 36/0011 |

OTHER PUBLICATIONS

International Search Report issued in corresponding International Application No. PCT/CN2021/087851, mailed Jul. 14, 2021, 4 pages.

Intel, "Report from Moderated Email Discussion on FS_MUSIM", 3GPP TSG SA#86 SP-191226, Dec. 2019.

Vivo, "Solution for UE Initiated Leave and Return A Network for Key Issue#3", SA WG2 Meeting #136AH S2-2000132, Jan. 2020.

Extended European Search Report issued in related European Application No. 21792146.9, mailed Aug. 7, 2023, 11 pages.

Examination Report issued in related Indian Application No. 202227066293, mailed Feb. 1, 2023, 12 pages.

Office Action issued in related Korean Application No. 10-2022-7038398, mailed Jul. 30, 2025, 13 pages.

3GPP TS 23.502 V16.4.0, the Procedures for the 5G System (5GS): Stage 2, and 3GPP server publication date Mar. 27, 2020.

* cited by examiner

STATE NOTIFICATION METHOD, DEVICE, AND SYSTEM

CROSS-REFERENCE TO RELATED APPLICATIONS

This application is a continuation of International Application No. PCT/CN2021/087851, filed on Apr. 16, 2021, which claims priority to Chinese Patent Application No. 202010313572.0 filed on Apr. 20, 2020. The entire contents of each of the above-referenced applications are expressly incorporated herein by reference.

TECHNICAL FIELD

Embodiments of the present disclosure relate to the field of communications technologies, and in particular, to a state notification method, a device, and a system.

BACKGROUND

To meet the needs of different users, terminal devices may be installed with two or more Subscriber Identity Module (SIM) cards. These terminal devices may be collectively referred to as multi-card terminal devices.

Currently, the multi-card terminal device can camp on multiple networks. In some embodiments, the multi-card terminal device can camp on multiple networks in a time-division manner. For example, a multi-card terminal device may camp on network A for a period of time and receive a paging message from network A during this period of time, and then camp on network B for a period of time and receive a paging message from network B during this period of time.

However, in the above process, since the multi-card terminal device can directly leaving one network and camp on another network, after the multi-card terminal device leaves a network, the network may still send data to the multi-card terminal device or reserve data of the multi-card terminal device. As a result, a state of the multi-card terminal device and a state of the network are not synchronized, resulting in incorrect statistics collection and unnecessary service processing in the network, thereby causing waste of resources.

SUMMARY

Embodiments of the present disclosure provide a state notification method, a device, and a system.

This application is implemented as follows:

In a first aspect, an embodiment of the present disclosure provides a state notification method, which can be applied to first UE. The method includes: before the first UE leaves a first network on which the first UE camps, determining, according to leaving notification configuration information, whether to send a leaving notification message; and if determining to send a leaving notification message, sending a leaving notification message to a first network device, where the leaving notification message is used to indicate that the first UE will leave the first network, and the first network is a network in which the first network device is located.

In a second aspect, an embodiment of the present disclosure provides a state notification method, which can be applied to a first network device. The method includes: sending leaving notification configuration information to first UE; and receiving a leaving notification message sent by the first UE, where the leaving notification message is used to indicate that the first UE will leave the first network, the first network is a network in which the first network device is located, and the leaving notification configuration information includes at least one of the following: information configured by the first network device and information of default setting of the first network device.

In a third aspect, an embodiment of the present disclosure provides UE, where the UE may be first UE, and the UE includes a determining module and a sending module. The determining module is configured to: before the first UE leaves a first network on which the first UE camps, determine, according to leaving notification configuration information, whether to send a leaving notification message; and the sending module is configured to: in a case that the determining module determines to send a leaving notification message, send a leaving notification message to a first network device, where the leaving notification message is used to indicate that the first UE will leave the first network, and the first network is a network in which the first network device is located.

In a fourth aspect, an embodiment of the present disclosure provides a network device. The network device may be a first network device, and the network device includes a sending unit and a receiving unit. The sending module is configured to send leaving notification configuration information to first UE; and the receiving module is configured to: after the sending module sends leaving notification configuration information to first UE, receive a leaving notification message sent by the first UE, where the leaving notification message is used to indicate that the first UE will leave the first network, the first network is a network in which the first network device is located, and the leaving notification configuration information includes at least one of the following: information configured by the first network device and information of default setting of the first network device.

In a fifth aspect, an embodiment of the present disclosure provide UE, including: a processor, a memory, and a computer program stored in the memory and executable on the processor, where the computer program, when executed by the processor, implements the steps of the state notification method according to the foregoing first aspect.

In a sixth aspect, an embodiment of the present disclosure provides a network device, including: a processor, a memory, and a computer program stored in the memory and executable on the processor, where the computer program, when executed by the processor, implements the steps of the state notification method according to the foregoing second aspect.

In a seventh aspect, an embodiment of the present disclosure provides a communications system, where the communications system includes the first UE according to the foregoing third aspect and the first network device according to the foregoing fourth aspect. In some embodiments, the communications system includes the UE according to the foregoing fifth aspect and the network device according to the foregoing sixth aspect.

In an eighth aspect, an embodiment of the present disclosure provides a computer readable storage medium, where the computer readable storage medium stores a computer program, and the computer program, when executed by a processor, implements the steps of the state notification method according to the foregoing first aspect or second aspect.

In the embodiments of the present disclosure, before the first UE leaves a first network on which the first UE camps, the first UE may determine, according to leaving notification configuration information, whether to send a leaving notification message; and if determining to send a leaving notification message, send a leaving notification message to a first network device, where the leaving notification message is used to indicate that the first UE will leave the first network, and the first network is a network in which the first network device is located. In this solution, on the one hand, before the first UE leaves the first network, the first UE can determine, according to the leaving notification configuration information, whether to send the leaving notification message to the first network device. Therefore, the leaving notification configuration information can indicate whether to send the leaving notification message to the first network device. If the leaving notification configuration information indicates that the leaving notification message is sent to the first network device, the first UE may determine that the first network device receives the leaving notification information sent by the first UE, and then the first UE may send the leaving notification message to the first network device. This can avoid resource waste caused because the first network device does not receive the leaving notification message sent by the first UE. On the other hand, by sending the leaving notification message to the first network device the first UE may notify the first network device that the first UE will leave the first network, so that after the first network device receives the leaving notification message, the first network device can stop service processing for the first UE, and incorrect statistics collection and unnecessary service processing of the first network device can be avoided.

DETAILED DESCRIPTION

Figure 1:
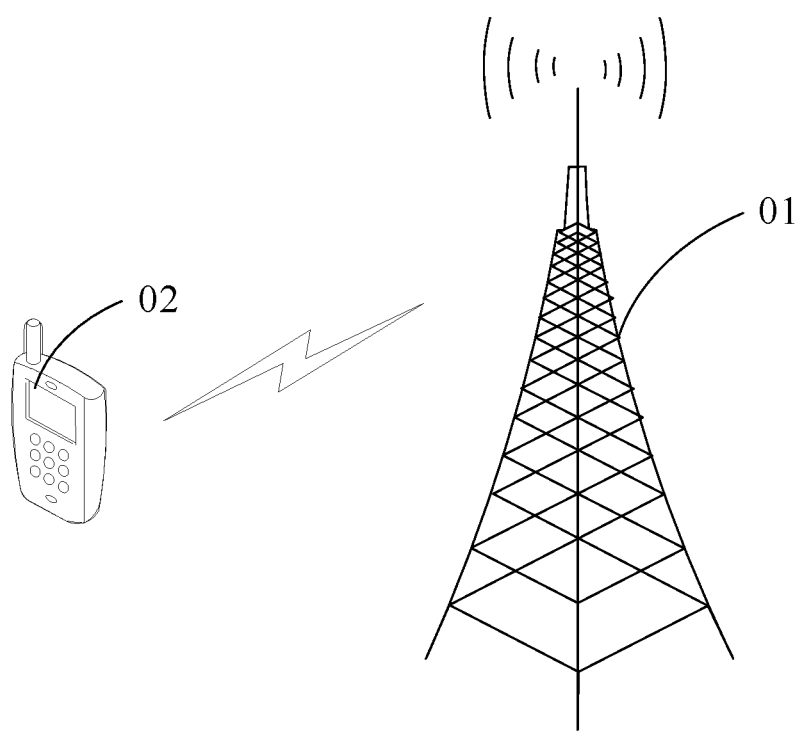
FIG. 1 is a schematic architectural diagram of a communications system according to an embodiment of the present disclosure.

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of this application.

It should be understood that in this specification, a term "and/or" is an associative relationship for describing associated objects, indicating that three relationships may exist, for example, A and/or B, which may indicate three situations: A exists independently; A and B exist simultaneously; and B exists independently. In this specification, a symbol "/" indicates an "or" relationship between associated objects, for example, A/B indicates A or B.

In the specification and claims of the present disclosure, the terms "first", "second", and so on are intended to distinguish between different objects but do not describe a particular order of the objects. For example, first UE and second UE are used to distinguish between different UEs, but are not used to describe a particular sequence of the UEs.

In the embodiments of the present disclosure, the term such as "exemplary" or "for example" is used to indicate an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

In the descriptions of the embodiments of the present disclosure, unless otherwise stated, "a plurality of" means two or more, for example, a plurality of elements mean two or more elements.

The embodiments of the present disclosure provide a state notification method, a device, and a system, before the first UE leaves a first network on which the first UE camps, the first UE may determine, according to leaving notification configuration information, whether to send a leaving notification message; and if determining to send a leaving notification message, send a leaving notification message to a first network device, where the leaving notification message is used to indicate that the first UE will leave the first network, and the first network is a network in which the first network device is located. In this solution, on the one hand, before the first UE leaves the first network, the first UE can determine, according to the leaving notification configuration information, whether to send the leaving notification message to the first network device. Therefore, the leaving notification configuration information can indicate whether to send the leaving notification message to the first network device. If the leaving notification configuration information indicates that the leaving notification message is sent to the first network device, the first UE may determine that the first network device receives the leaving notification information sent by the first UE, and then the first UE may send the leaving notification message to the first UE. This can avoid resource waste caused because the first network device does not receive the leaving notification message sent by the first UE. On the other hand, by sending the leaving notification message to the first network device the first UE may notify the first network device that the first UE will leave the first network, so that after the first network device receives the leaving notification message, the first network device can stop service processing for the first UE, and incorrect statistics collection and unnecessary service processing of the first network device can be avoided.

The state notification method provided in the embodiments of the present disclosure may be applied to a communications system. The communications system may be a wireless communications system, and the wireless communications system may include a network device (for example, the first network device in the embodiments of the present disclosure) and UE (for example, the first UE and the second UE in the embodiments of the present disclosure). As shown in FIG. 1, FIG. 1 is a schematic architectural diagram of a wireless communications system according to an embodiment of the present disclosure. In FIG. 1, the wireless communications system may include a network device 01 and UE 02. A connection may be established between the network device 01 and the UE 02. It can be understood that the network device 01 and the UE 02 may be connected wirelessly.

For example, in the embodiments of the present disclosure, the UE may be a SIM card installed in a terminal device, or may be multiple devices associated with the terminal device. For example, the terminal device and multiple UEs may be multiple devices in the same Internet of Things, and the terminal device may serve as a control device of the multiple UEs.

In the embodiments of the present disclosure, when the UE is a device, the UE may be a device that provides a user with voice and/or data connectivity, a handheld device that has a wired/wireless connection function, or another processing device connected to a wireless modem. The UE may communicate with one or more core network devices through a Radio Access Network (RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus, which exchanges voice and/or data with the RAN. For example, the mobile apparatus is a device such as a Personal Communication Service (PCS) phone, a cordless phone, a Session Initiation Protocol (SIP) phone, a Wireless Local Loop (WLL) station, or a Personal Digital Assistant (PDA). The UE may also be referred to as a user agent or UE or the like.

In the embodiments of the present disclosure, the network device is a device deployed in the RAN to provide a wireless communication function for the UE. In the embodiments of the present disclosure, the network device may be a base station, and the base station may include various forms of macro base stations, micro base stations, relay stations, access points, and the like. In systems using different radio access technologies, the names of devices with base station functions may be different. For example, in a 5G system, the device can be called a 5G gNodeB (gNB). In a fourth-generation wireless communication (4-Generation, 4G) system, such as a Long Term Evolution (LTE) system, the device can be called an evolved NodeB (eNB). In a third-generation mobile communication (3G) system, the device can be called a NodeB. The name "base station" may vary with evolution of communications technologies.

In the embodiments of the present disclosure, after the UE (for example, the first UE in the embodiments of the present disclosure) camps on a network (for example, the first network in the embodiments of the present disclosure), if the UE needs to leaving the network for some reason, the UE may determine, according to the leaving notification configuration information before leaving the network, whether to send a leaving notification message to the network device (for example, the first network device in the embodiments of the present disclosure) corresponding to the network, to notify the first network device that the UE leaves the network. In some embodiments, if the UE determines to send the leaving notification message, the UE may determine that the network device receives the leaving notification message sent by the UE. Then, the UE sends the leaving notification message to the network device to notify the network device that the UE will leave the network. In this way, after the network device receives the leaving notification message, the network device can stop service processing for the first UE, so that incorrect statistics collection and unnecessary service processing of the first network device can be avoided.

It should be noted that, when the first UE is a device, the first UE can directly execute the state notification method provided by the embodiments of the present disclosure, and when the first UE is a SIM card, the first UE can execute the state notification method provided by the embodiments of the present disclosure by using the terminal device of the first UE (that is, the terminal device installed with the first UE). To clearly describe the state notification method provided by the embodiments of the present disclosure, the following embodiment uses the first UE as an execution entity for exemplary description.

The state notification method provided by the embodiments of the present disclosure is exemplarily described below with reference to the accompanying drawings.

Figure 2:
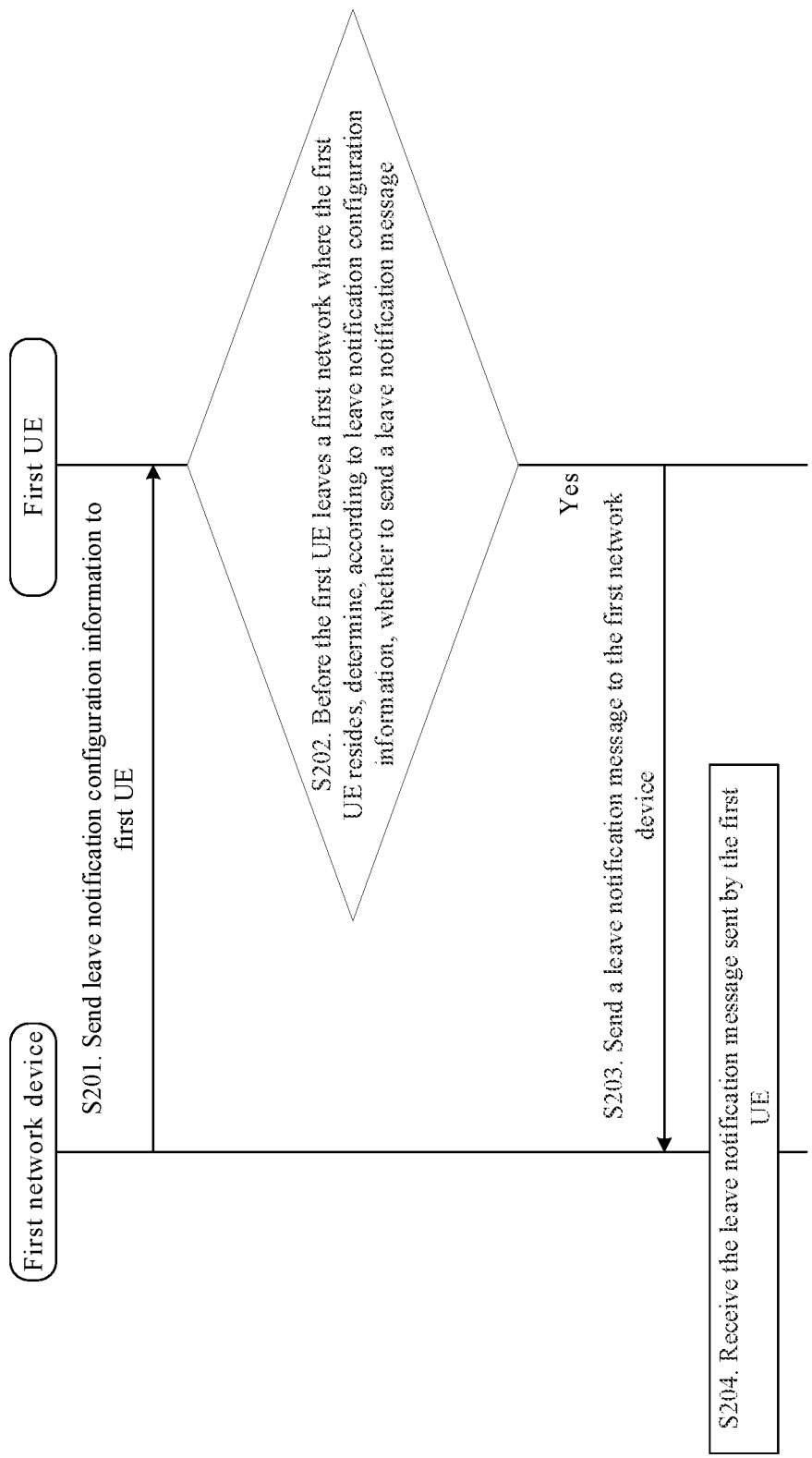
FIG. 2 is a schematic diagram 1 of a state notification method according to an embodiment of the present disclosure.

As shown in FIG. 2, an embodiment of the present disclosure provides a state notification method, which can be applied to the wireless communication system shown in FIG. 1. The method can include the following S201 to S204.

S201. A first network device sends leaving notification configuration information to first UE.

The leaving notification configuration information may include at least one of the following: information configured by the first network device and information of default setting of the first network device.

In the embodiments of the present disclosure, after the first UE camps on the network in which the first network device is located (that is, the first network in the embodiments of the present disclosure), the first network device may send the leaving notification configuration information to the first UE.

For example, in the embodiments of the present disclosure, the information configured by the first network device may include at least one of the following:

whether the first network device supports receiving of the leaving notification message;

a UE state in which the first network device allows to send a leaving notification message;

a triggering condition in which the first network device allows to send a leaving notification message; and indication information, where the indication information may be used to indicate whether the information configured by the first network device is in an active state.

It should be noted that, in the embodiments of the present disclosure, the leaving notification message may also be called a leaving notification or a leaving message, which may be determined according to actual usage requirements and is not limited in the embodiments of the present disclosure.

The content included in the first configuration information will be exemplarily described below.

In the embodiments of the present disclosure, for "whether the first network device supports receiving of a leaving notification message", if the first network device supports receiving of a leaving notification message, when the first UE sends a leaving notification message to the first network device, the first network device receives the leaving notification message sent by the UE; and if the first network device does not support receiving of the leaving notification message, when the first UE sends the leaving notification message to the first network device, the first network device does not receive the leaving notification message sent by the UE. That is, "whether the first network device supports receiving of a leaving notification message" may reflect the capability of the first network device.

For example, in the embodiments of the present disclosure, the UE state in which the first network device allows to send a leaving notification message may include at least one of the following states: a connected state, an inactive state, and an idle state. This may be determined according to an actual usage requirement, and is not limited in the embodiments of the present disclosure.

For example, in the embodiments of the present disclosure, the triggering condition in which the first network device allows to send a leaving notification message (that is, the reason why the first network device allows the first UE to send the leaving notification message) may include at least one of the following:
  second UE initiates a signaling process (signaling);
  the second UE receives a paging message;
  the second UE establishes a voice service; and
  the second UE transmits a task;
  where the second UE and the first UE may be UEs controlled by a same terminal device.

It can be understood that, in the embodiments of the present disclosure, the triggering condition in which the first network device allows to send a leaving notification message may all be: an event that another UE controlled by the terminal device controlling the first UE causes the first UE to leaving the first network (the network in which the first network device is located).

For example, in the embodiments of the present disclosure, the first UE and the second UE may be SIM cards installed on a same terminal device; or the first UE and the second UE may also be UEs associated with a same terminal device, which can be determined according to the actual use requirements.

For example, in the embodiments of the present disclosure, that the second UE initiates a signaling process may include any possible signaling process, for example, the second UE initiates a registration process, the second UE initiates an attach process, and the second UE performs mobility update. This may be determined according to an actual usage requirement, and is not limited in the embodiments of the present disclosure.

For example, in the embodiments of the present disclosure, the voice service established by the second UE may include at least one of the following voice services: a voice call, Mobile Origination Voice (MO Voice), and Mobile Termination Voice (MT Voice).

It should be noted that, in the embodiments of the present disclosure, for the MO Voice, the first UE may be calling UE, and for the MT Voice, the second UE may be called UE.

In the embodiments of the present disclosure, in a case that the information configured by the first network device includes the indication information, if the indication information is used to indicate that the information configured by the first network device is in an active state, after the first UE receives the information configured by the first network device, the information configured by the first network device can take effect, that is, the information configured by the first network device can be set up (setup).

If the indication information is used to indicate that the information configured by the first network device is in an inactive state, after the first UE receives the information configured by the first network device, the information configured by the first network device does not take effect. That is, the first network device may first send the information configured by the first network device to the first UE, and then determine, according to a network state or a scenario of the first network (for example, a signaling congestion state of the first network), when to activate the information configured by the first network device.

In the embodiments of the present disclosure, if the information configured by the first network device does not include the indication information, after the first UE receives the information configured by the first network device, the information configured by the first network device can take effect. That is, after receiving the information configured by the first network device, the first UE can directly establish the information configured by the first network device.

For example, in the embodiments of the present disclosure, the information configured by the first network device may be configured through a configuration message.

The configuration message may include at least one of the following: a system message and a Radio Resource Control (RRC) message.

It can be understood that in the embodiments of the present disclosure, the first network device may send the information configured by the first network device to the first UE through a system message; or may send the information configured by the first network device to the first UE through an RRC message; or may send one part of the information configured by the first network device to the first UE through a system message, and the other part of the information configured by the first network device to the first UE through an RRC message. This may be determined according to an actual usage requirement, and is not limited in the embodiments of the present disclosure.

In the embodiments of the present disclosure, when the configuration message includes a system message, the first network device may broadcast, through the system message, the information configured by the first network device.

For example, in the embodiments of the present disclosure, when the configuration message includes a system message, the system message may be a System Information Block 1 (SIB1).

For example, in the embodiments of the present disclosure, when the configuration message includes an RRC message, the RRC message may be an RRC reconfiguration message or an RRC resume message. This may be determined according to an actual usage requirement, and is not limited in the embodiments of the present disclosure.

For example, in the embodiments of the present disclosure, the information configured by the first network device may be carried in an information element of the configuration message.

In the embodiments of the present disclosure, when the configuration message includes a system message, the information configured by the first network device may be carried in an information element of the system message, that is, the system message may include an information element that carries the information configured by the first network device. When the configuration message includes an RRC message, the information configured by the first network device may be carried in an information element of the RRC message, that is, the RRC message may include an information element that carries the information configured by the first network device.

Exemplarily, when the configuration message includes an information element that carries the information configured by the first network device, the information element may include but is not limited to the following information element.

In some embodiments, as a possible implementation manner, a data structure of the information element carrying the information configured by the first network device can be, for example, as follows:
  LeavingNotificationConfig {Setup, Release}//set up or release a leaving notification configuration
  AllowedState: {Connected, Inactive, Idle}//state in which sending of a leaving notification is allowed As another possible implementation manner, a data structure of the information element carrying the information configured by the first network device can be, for example, as follows:

LeavingNotificationConfig {Setup}//set up a leaving notification configuration

AllowedState: {Connected, Inactive}//state in which sending of a leaving notification is allowed It should be noted that, in the embodiments of the present disclosure, the "setting up or releasing a leaving notification configuration" refers to setting up or releasing the information configured by the first network device. Correspondingly, setting up the leaving notification configuration refers to setting up the information configured by the first network device.

For example, in the embodiments of the present disclosure, the information of default setting of the first network device may include at least one of the following:

whether the first network device supports receiving of the leaving notification message; and a UE state in which the first network device allows to send a leaving notification message.

It should be noted that, in the embodiments of the present disclosure, for description of whether the first network device supports receiving of a leaving notification message and a UE state in which the first network device allows to send a leaving notification message, refer to the detailed description in the foregoing embodiment. To avoid repetition, details are not repeated herein.

In the embodiments of the present disclosure, the information of default setting of the first network device may be understood as: the default settings of the first network device. After the first UE camps on the first network, the first UE may query the default settings of the first network, so as to obtain the information of default setting of the first network device.

For example, in the embodiments of the present disclosure, as an implementation manner, the information of default setting of the first network device may default that the first network device does not support receiving of a leaving notification message.

It should be noted that, in the embodiments of the present disclosure, if the leaving notification configuration information includes: the information configured by the first network device and the information of default setting of the first network device, and the information configured by the first network device and the information of default setting of the first network device both include: whether the first network device supports receiving of the leaving notification message, the first UE may determine, according to the information configured by the first network device, whether the first network device supports receiving of the leaving notification message.

That is, the priority of the information configured by the first network device is higher than the priority of the information of default setting of the first network device.

Exemplarily, assuming that the information configured by the first network device indicates that the first network device supports receiving of the leaving notification message, and the information of default setting of the first network device indicates that the first network device does not support receiving of the leaving notification message, the first UE may determine that the network device supports receiving of the leaving notification message. Assuming that the information configured by the first network device indicates that the first network device does not support receiving of the leaving notification message, and the information of default setting of the first network device indicates that the first network device supports receiving of the leaving notification message, the first UE may determine that the first network device does not support receiving of the leaving notification message.

S202. Before the first UE leaves a first network on which the first UE camps, determine, according to leaving notification configuration information, whether to send a leaving notification message.

In the embodiments of the present disclosure, if the first UE will leave the first network, the first UE may determine, according to the leaving notification configuration information, whether to send a leaving notification message to the first network device.

For example, in the embodiments of the present disclosure, for the first UE, the leaving notification configuration information may include at least one of the following:

information configured by the first network device;

acquired information of default setting of the first network device; and predefined information, that is, information agreed in the protocol.

It should be noted that, in the embodiments of the present disclosure, for the relevant description of the information configured by the first network device and the information of default setting of the first network device, refer to the detailed description in the foregoing embodiment. To avoid repetition, this is not repeated herein.

For example, in the embodiments of the present disclosure, the predefined information may include at least one of the following:

a state of UE allowed by the network device to send a leaving notification message;

the UE determines whether the network device supports receiving of a leaving notification message; and the network device does not support receiving of a leaving notification message.

For example, in the embodiments of the present disclosure, the predefined information may indicate that the state of UE allowed by the network device to send a leaving notification message is a connected state (connected).

Of course, in actual implementation, the predefined information may also indicate that the state of UE allowed by the network device to send a leaving notification message includes any other possible UE state, which may be determined according to actual usage requirements and is not limited in the embodiments of the present disclosure.

For example, in the embodiments of the present disclosure, the UE may determine, according to information configured by the first network device, whether the first network device supports receiving of a leaving notification message.

It should be noted that, in the embodiments of the present disclosure, if the leaving notification configuration information includes: the information configured by the first network device and the predefined information, and the information configured by the first network device and the predefined information both include: whether the first network device supports receiving of the leaving notification message, the first UE may determine, according to the information configured by the first network device, whether the first network device supports receiving of the leaving notification message.

That is, the priority of the information configured by the first network device is higher than the priority of the predefined information.

Exemplarily, assuming that the information configured by the first network device indicates that the first network device supports receiving of a leaving notification message, and the predefined information indicates that the first network device does not support receiving of a leaving notification message, the first UE may determine that the first network device supports receiving of the leaving notification message.

For example, in the embodiments of the present disclosure, if the first network device does not support receiving of the leaving notification message, the first UE may determine not to send the leaving notification message to the first network device.

For example, in the embodiments of the present disclosure, in the case that the first network device supports receiving of the leaving notification message, the first UE may determine, according to the UE state in which the first network device allows to send a leaving notification message and the triggering condition in which the first network device allows to send a leaving notification message, whether to send a leaving notification message to the first network device.

For example, in the embodiments of the present disclosure, if the state of the first UE is the UE state in which the first network device allows to send a leaving notification message, and the reason why the first UE leaves the first network is the triggering condition in which the first network device allows to send a leaving notification message, the first UE may determine to send a leaving notification message to the first network device. Therefore, the first UE may perform the following S203. If the state of the first UE is not the UE state in which the first network device allows to send a leaving notification message, and/or the reason why the first UE leaves the first network is not the triggering condition in which the first network device allows to send a leaving notification message, the first UE may determine not to send a leaving notification message to the first network device.

S203. The first UE sends a leaving notification message to the first network device.

The leaving notification message may be used to indicate that the first UE will leave the first network, and the first network may be the network in which the first network device is located.

S204. The first network device receives the leaving notification message sent by the first UE.

In the embodiments of the present disclosure, after the first UE determines to send a leaving notification message to the first network device, the first UE may send a leaving notification message to the first network device, so as to notify the first network device that the first UE leaves the network in which the first network device is located (that is, the first network).

For example, in the embodiments of the present disclosure, the leaving notification message may be sent through an RRC setup complete message, an RRC reconfiguration complete message, an RRC resume complete message (also called an RRC resume response message), UE assistance information, or a Non-Access Stratum (NAS) message.

For example, in the embodiments of the present disclosure, when the state of the first UE is a connected state, the first UE may send the leaving notification message through an RRC reconfiguration complete message, UE assistance information, or a NAS message.

For example, in the embodiments of the present disclosure, when the state of the first UE is an idle state, the first UE may send the leaving notification message through an RRC setup complete message, UE assistance information, or a NAS message.

For example, in the embodiments of the present disclosure, when the state of the first UE is an inactive state, the first UE may send the leaving notification message through an RRC resume complete message, UE assistance information, or a NAS message, The embodiments of the present disclosure provide a state notification method. On the one hand, before the first UE leaves the first network, the first UE can determine, according to the leaving notification configuration information, whether to send the leaving notification message to the first network device. Therefore, the leaving notification configuration information can indicate whether to send the leaving notification message to the first network device. If the leaving notification configuration information indicates that the leaving notification message is sent to the first network device, the first UE may determine that the first network device receives the leaving notification information sent by the first UE, and then the first UE may send the leaving notification message to the first UE. This can avoid resource waste caused because the first network device does not receive the leaving notification message sent by the first UE. On the other hand, by sending the leaving notification message to the first network device the first UE may notify the first network device that the first UE will leave the first network, so that after the first network device receives the leaving notification message, the first network device can stop service processing for the first UE, and incorrect statistics collection and unnecessary service processing of the first network device can be avoided.

For example, in the embodiments of the present disclosure, after the first network device sends the information configured by the first network device to the first UE, the network device may send update information (for example, update configuration information in the embodiments of the present disclosure) to the first UE according to a target reason, to update the information configured by the first network device, so that the information configured by the first network device conforms to the network environment of the first network (the network in which the first network device is located).

For example, in the embodiments of the present disclosure, the target reason may be a reason caused by the network state or scenario of the first network, for example, any possible reason such as a signaling congestion state of the first network, which may be determined according to actual usage requirements and is not limited in the embodiments of the present disclosure.

Figure 3:
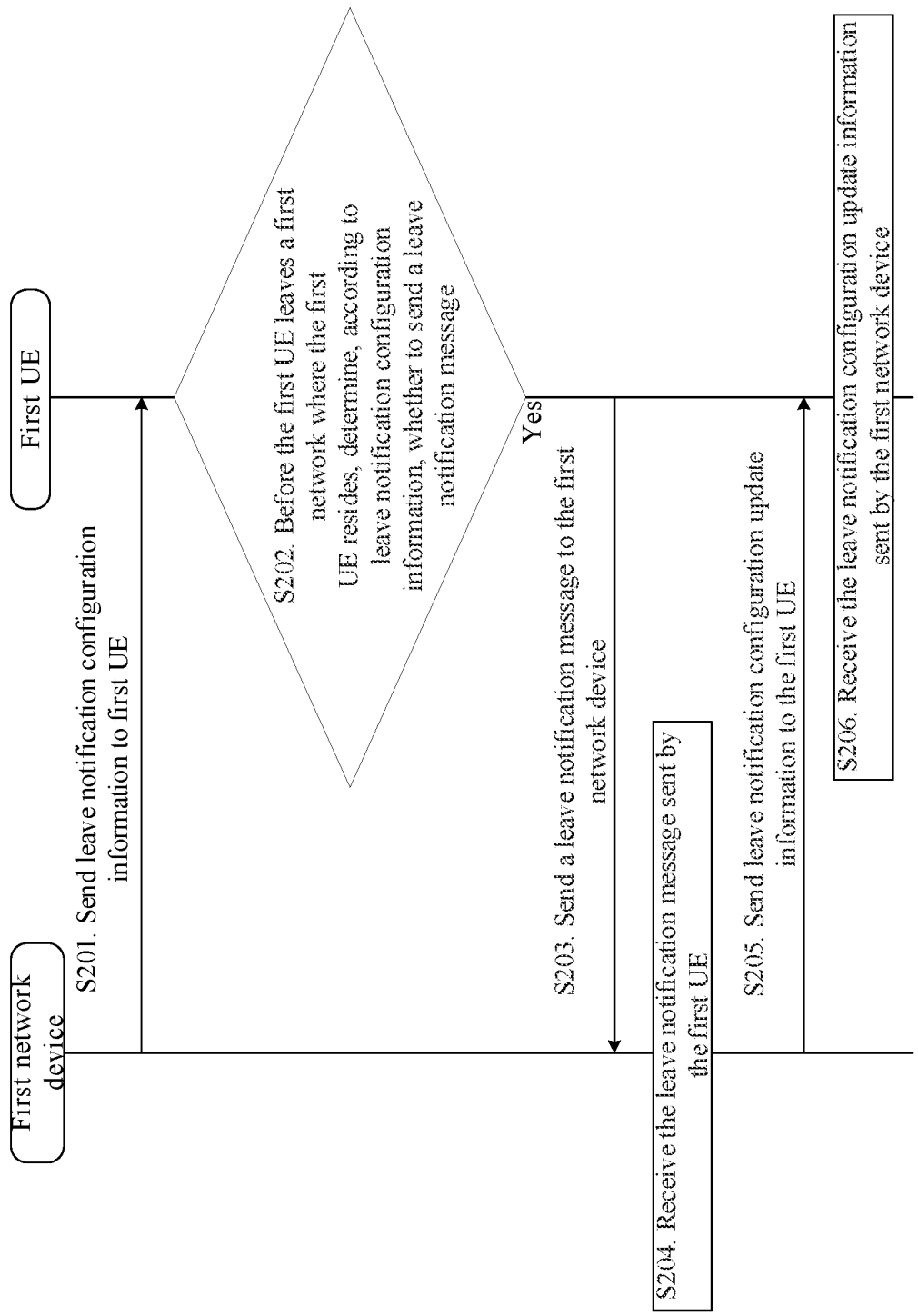
FIG. 3 is a schematic diagram 2 of a state notification method according to an embodiment of the present disclosure.

Exemplarily, with reference to the foregoing FIG. 2, as shown in FIG. 3, after the foregoing S201, the state notification method provided by the embodiments of the present disclosure may further include the following S205 and S206.

It should be noted that the embodiments of the present disclosure may not limit the execution order between S202 to S204 and S205 and S206. In actual implementation, S202 to S204 may be executed first and then S205 and S206 may be executed; or S205 and S206 may be executed first and then S202 to S204 may be executed. FIG. 3 is an example for performing S202 to S204 first and then performing S205 and S206.

S205. The first network device sends leaving notification configuration update information to the first UE.

The leaving notification configuration update information may be used to update the information configured by the first network device.

S206. The first UE receives the leaving notification configuration update information sent by the first network device.

In the embodiments of the present disclosure, after the first UE receives the leaving notification configuration update information, the first UE may update, according to the leaving notification configuration update information, the information configured by the first network device.

For example, in the embodiments of the present disclosure, the updating the information configured by the first network device may include any of the following:

activating the information configured by the first network device;

deactivating the information configured by the first network device;

modifying the information configured by the first network device;

activating and modifying the information configured by the first network device; and deactivating and modifying the information configured by the first network device.

It should be noted that, in the embodiments of the present disclosure, the deactivating the information configured by the first network device can be understood as: releasing the information configured by the first network device, that is, making the information configured by the first network device not take effect (or invalid).

In the embodiments of the present disclosure, when the indication information in the information configured by the first network device indicates that the information configured by the first network device is in an active state, the first network device may deactivate, through the leaving notification configuration update information, the information configured by the first network device, so that the information configured by the first network device is in an inactive state.

Correspondingly, when the indication information in the information configured by the first network device indicates that the information configured by the first network device is in an inactive state, the first network device may activate, through the leaving notification configuration update information, the information configured by the first network device, so that the information configured by the first network device is in an active state.

In the embodiments of the present disclosure, the first network device may modify, through the leaving notification configuration update information, the content in the information configured by the first network device. For example, the UE state in which the first network device allows to send a leaving notification message is modified, the triggering condition in which the first network device allows to send a leaving notification message is modified, and that the first network device supports receiving of the leaving notification message is modified to that the first network device does not support receiving of the leaving notification message.

In the embodiments of the present disclosure, since the first network device can update, through the leaving notification configuration update information, the information configured by the first network device, the first network device can flexibly control sending of the leaving notification message according to the network state or scenario of the first network, to reduce the signaling loads.

To illustrate the embodiments of the present disclosure more clearly, the following embodiments illustrate different application scenarios of the state notification method provided by the embodiments of the present disclosure through the following embodiment 1, embodiment 2, and embodiment 3.

Embodiment 1: The leaving notification configuration information includes the information configured by the first network device and the information of default setting of the first network device, and the first network device broadcasts, through a system message, the information configured by the first network device.

1. The first UE camps on the first network.

2. The first UE determines the default setting of the first network device, that is, the first UE acquires information of the default setting of the first network device.

The default setting of the first network device includes any one of the following:

a) the first network device does not support receiving of a leaving notification message by default;

b) the first network device supports receiving of a leaving notification message by default; and c) the first network device supports receiving of a leaving notification message by default, and has a state of UE allowed to send a leaving notification message by default. The state of UE allowed to send a leaving notification message may include at least one of the following:

connected state;

inactive state; and idle state.

3. The first UE receives the system message broadcast by the first network device.

The first network device sends, through a system message, a parameter of the information configured by the first network device to the first UE.

The parameter may include one or more of the following:

whether to support receiving of a leaving notification message (for example, supported or not supported);

the state of UE allowed to send a leaving notification message, which can include at least one of the following: connected state, inactive state, and idle state;

the triggering condition for allowing sending of a leaving notification message, which may include at least one of the following: the second UE initiates a signaling process, the second UE receives a paging message, the second UE establishes a voice service (which may include voice call, MO Voice, and MT Voice), the second UE transmits a task, or the like; and the information configured by the first network device is in an active state or an inactive state (configuration setup or release), that is, the information configured by the first network device is set up or released.

Exemplarily, the first network device carries, in system information (for example, SIB1), an information element including the information configured by the first network device, and the information element may include but is not limited to the following information elements.

As a first possible implementation, the data structure of the information element can be, for example, as follows:

LeavingNotificationConfig {Setup, Release}//set up or release a leaving notification configuration AllowedState: {Connected, Inactive, Idle}//state in which sending of a leaving notification is allowed As a second possible implementation manner, the data structure of the information element can be, for example, as follows:

LeavingNotificationConfig {Setup}//set up a leaving notification configuration

AllowedState: {Connected, Inactive}//state in which sending of a leaving notification is allowed In Embodiment 1, if the first network device does not send the information configured by the first network device to the first UE, the first UE may process according to the default setting of the first network device.

4. The first UE evaluates, according to the leaving notification configuration information (including information configured by the first network device and/or default setting of the first network device), whether to send a leaving notification message to the first network device.

Exemplarily, in a multi-card terminal device, the first UE receives paging in an idle state, and then the terminal device needs to leaving the first network on which the first UE camps (that is, the network in which the first network device is located), and performs sending and receiving tasks through the second UE. At this time, the first UE may evaluate, according to the leaving notification configuration information, whether to send a leaving notification message to the first network device:

1) If the first network device does not allow the first UE to send the leaving notification message in the idle state, the first UE may determine that it is not necessary to send the leaving notification message to the first network device.
2) If the first network device allows the first UE to send a leaving notification message in an idle state, the first UE may initiate a connection establishment process, and send a leaving notification message to the first network device through an RRC setup complete message.

Another example: in a multi-card terminal device, the first UE receives paging in an inactive state, and then the terminal device needs to leaving the first network on which the first UE camps, and perform sending and receiving tasks through the second UE. At this time, the first UE may evaluate, according to the leaving notification configuration information, whether to send a leaving notification message to the first network device:

1) If the first network device does not allow the first UE to send the leaving notification message in the inactive state, the first UE may determine that it is not necessary to send the leaving notification message to the first network device.
2) If the first network device allows the first UE to send a leaving notification message in the inactive state, the first UE may initiate an RRC resume process, and send a leaving notification message to the first network device through an RRC resume complete message, to notify the first network device that the first UE leaves the first network.

Embodiment 2: The leaving notification configuration information includes information configured by the first network device, and the first network device sends the leaving notification configuration information through an RRC message.

1. The first UE camps on the first network, and the first UE is in a connected state.
2. The first network device sends information configured by the first network device to the first UE.

The first network device may send the setup leaving notification configuration to the first UE through an RRC message (for example, an RRC reconfiguration message or an RRC resume message).

Exemplarily, the first network device may carry an information element of the leaving notification configuration information in the RRC message, and the information element may include but not limited to the following information elements.

As a first implementation, the data structure of the information element can be, for example, as follows:

LeavingNotificationConfig {Setup, Release}//set up or release a leaving notification configuration AllowedState: {Connected, Inactive, Idle}//state in which sending of a leaving notification message is allowed As a second implementation manner, the data structure of the information element can be, for example, as follows:

LeavingNotificationConfig {Setup}//set up a leaving notification configuration

AllowedState: {Connected}//state in which sending of a leaving notification message is allowed 3. The first UE evaluates, according to the leaving notification configuration information, whether to send a leaving notification to the first network device.

Exemplarily, if the first UE determines that the first network device supports sending of a leaving notification message in a connected state, the first UE may send a leaving notification message to the first network device through an RRC reconfiguration complete message, or send a leaving notification message to the first network device through UE assistance information, to notify the first network device that the first UE leaves the first network.

4. The first network device updates the leaving notification configuration information.

The first network device may update the leaving notification configuration information through an RRC message such as an RRC reconfiguration message according to a first network signaling congestion state or other reasons.

The updating the leaving notification configuration information may be setting up the leaving notification configuration information, or modifying the notification configuration information, or releasing the leaving notification configuration information.

Embodiment 3: The leaving notification configuration information includes predefined information and information configured by the first network device.

1. The predefined (that is, agreed in the protocol) information includes a part of the leaving notification configuration information.

In an implementation manner, the information agreed in the protocol may include one or more of the following:

the state of the UE allowed to send a leaving notification message is connected;

the UE determines, according to the received information of configuration of the network device, whether the network device supports receiving of the leaving notification message; and the network device does not support receiving of a leaving notification message by default.

2. The first UE camps on the first network, and obtains the leaving notification configuration of the first network by receiving information configured by the first network device sent by the first network device.

The first network device may send the information configured by the first network device through a system message and/or an RRC message.

As an implementation manner, the first network device may carry the information configured by the first network device in the information element of the system information and/or the RRC message, and the data format of the information element may be, for example, as follows:

LeavingNotificationConfig {Setup, Release}//set up or release a leaving notification configuration In Embodiment 3, if the first network device does not send the information configured by the first network device to the first UE, the first UE may process the information according to the above-mentioned agreement in the protocol.

3. The first UE evaluates, according to the leaving notification configuration information (including the information configured by the first network device and/or the information agreed in the protocol), whether to send a leaving notification message to the first network device.

Exemplarily, in a multi-card terminal device, the first UE performs data services in a connected state, and then the terminal device needs to leave the first network of the first UE, and perform sending and receiving tasks through the second UE. At this time, the first UE may evaluate, according to the leaving notification configuration information, whether to send a leaving notification message to the first network device:

1) If the first network device does not allow the first UE to send a leaving notification message in the connected state, the first UE may determine that it is not necessary to send a leaving notification message to the first network device.
2) If the first network device allows the first UE to send a leaving notification message in the connected state, the first UE can send a leaving notification message to the first network device, to notify the first network device that the first UE leaves the first network.

Figure 4:
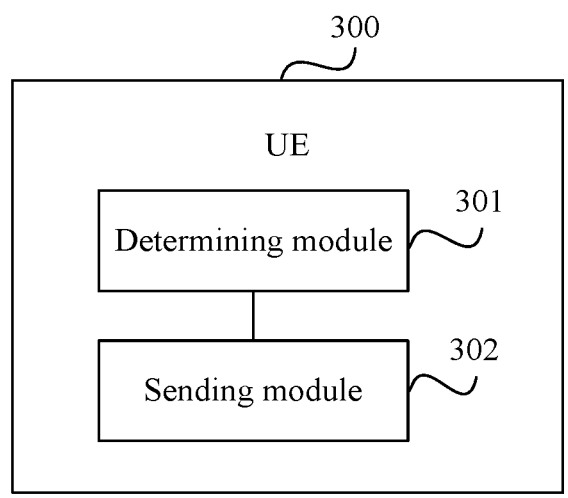
FIG. 4 is a schematic structural diagram of UE according to an embodiment of the present disclosure.

As shown in FIG. 4, an embodiment of the present disclosure provides UE 300, where the UE 300 may be first UE, and the UE 300 may include a determining module 301 and a sending module 302. The determining module 301 is configured to: before the first UE leaves a first network on which the first UE camps, determine, according to leaving notification configuration information, whether to send a leaving notification message; and the sending module 302 is configured to: in a case that the determining module 301 determines to send a leaving notification message, send a leaving notification message to a first network device, where the leaving notification message is used to indicate that the first UE will leave the first network, and the first network is a network in which the first network device is located.

For example, in the embodiments of the present disclosure, the leaving notification configuration information includes at least one of the following:
information configured by the first network device;
acquired information of default setting of the first network device; and
predefined information.

For example, in the embodiments of the present disclosure, the information configured by the first network device includes at least one of the following:
whether the first network device supports receiving of the leaving notification message;
a UE state in which the first network device allows to send a leaving notification message;
a triggering condition in which the first network device allows to send a leaving notification message; and
indication information, where the indication information is used to indicate whether the information configured by the first network device is in an active state.

For example, in the embodiments of the present disclosure, the triggering condition in which the first network device allows to send a leaving notification message includes at least one of the following:

second UE initiates a signaling process;
the second UE receives a paging message;
the second UE establishes a voice service; and
the second UE transmits a task;
where the second UE and the first UE are UEs controlled by a same terminal device.

For example, in the embodiments of the present disclosure, the UE may further include a receiving module. The receiving module is configured to receive leaving notification configuration update information sent by the first network device, where the leaving notification configuration update information is used to update the information configured by the first network device.

For example, in the embodiments of the present disclosure, the updating the information configured by the first network device includes any of the following:
activating the information configured by the first network device;
deactivating the information configured by the first network device;
modifying the information configured by the first network device;
activating and modifying the information configured by the first network device; and
deactivating and modifying the information configured by the first network device.

For example, in the embodiments of the present disclosure, the information configured by the first network device is configured through a configuration message;
where the configuration message includes at least one of the following: a system message and an RRC message.

For example, in the embodiments of the present disclosure, the information configured by the first network device is carried in an information element of the configuration message.

For example, in the embodiments of the present disclosure, the information of default setting of the first network device includes at least one of the following:
whether the first network device supports receiving of the leaving notification message; and
a UE state in which the first network device allows to send a leaving notification message.

For example, in the embodiments of the present disclosure, the predefined information includes at least one of the following:
a state of UE allowed by the network device to send a leaving notification message;
the UE determines whether the network device supports receiving of a leaving notification message; and
the network device does not support receiving of a leaving notification message.

For example, in the embodiments of the present disclosure, the leaving notification message is sent through an RRC setup complete message, an RRC reconfiguration complete message, an RRC recovery complete message, UE assistance information, or a NAS message.

The first UE provided in the embodiments of the present disclosure can implement each process performed by the first UE in the above-mentioned embodiment of the state notification method, and can achieve the same technical effect. To avoid repetition, details are not repeated herein.

The embodiments of the present disclosure provide UE. On the one hand, before the first UE leaves the first network, the first UE can determine, according to the leaving notification configuration information, whether to send the leaving notification message to the first network device. Therefore, the leaving notification configuration information can indicate whether to send the leaving notification message to the first network device. If the leaving notification configuration information indicates that the leaving notification message is sent to the first network device, the first UE may determine that the first network device receives the leaving notification information sent by the first UE, and then the first UE may send the leaving notification message to the first UE. This can avoid resource waste caused because the first network device does not receive the leaving notification message sent by the first UE. On the other hand, by sending the leaving notification message to the first network device the first UE may notify the first network device that the first UE will leave the first network, so that after the first network device receives the leaving notification message, the first network device can stop service processing for the first UE, and incorrect statistics collection and unnecessary service processing of the first network device can be avoided.

Figure 5:
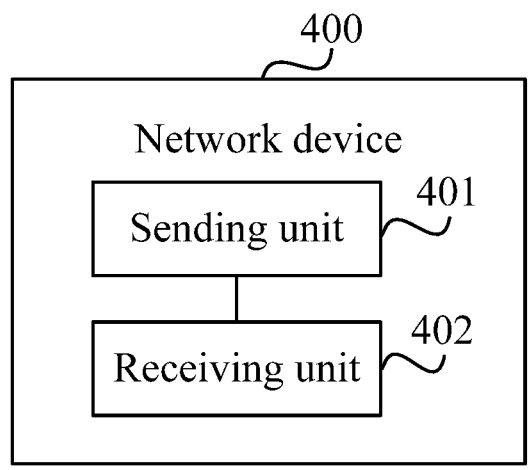
FIG. 5 is a schematic structural diagram of a network device according to an embodiment of the present disclosure.

As shown in FIG. 5, an embodiment of the present disclosure provides a network device 400, where the network device 400 may be a first network device, and the network device 400 may include a sending unit 401 and a receiving unit 402. The sending module 401 is configured to send leaving notification configuration information to first UE; and the receiving module 402 is configured to: after the sending module 401 sends leaving notification configuration information to first UE, receive a leaving notification message sent by the first UE, where the leaving notification message is used to indicate that the first UE will leave the first network, the first network is a network in which the first network device is located, and the leaving notification configuration information includes at least one of the following: information configured by the first network device and information of default setting of the first network device.

For example, in the embodiments of the present disclosure, the information configured by the first network device includes at least one of the following:
  whether the first network device supports receiving of the leaving notification message; and
  a UE state in which the first network device allows to send a leaving notification message;
  a triggering condition in which the first network device allows to send a leaving notification message; and
  indication information, where the indication information is used to indicate whether the information configured by the first network device is in an active state.

For example, in the embodiments of the present disclosure, the triggering condition in which the first network device allows to send a leaving notification message includes at least one of the following:
  second UE initiates a signaling process;
  the second UE receives the paging message;
  the second UE establishes a voice service; and
  the second UE transmits a task;
  where the second UE and the first UE are UEs controlled by a same terminal device.

For example, in the embodiments of the present disclosure, the sending unit 401 may be further configured to send leaving notification configuration update information to the first UE, where the leaving notification configuration update information is used to update the information configured by the first network device.

For example, in the embodiments of the present disclosure, the updating the information configured by the first network device includes any of the following:
  activating the information configured by the first network device;
  deactivating the information configured by the first network device;
  modifying the information configured by the first network device;
  activating and modifying the information configured by the first network device; and
  deactivating and modifying the information configured by the first network device.

For example, in the embodiments of the present disclosure, the information configured by the first network device is configured through a configuration message;
  where the configuration message includes at least one of the following: a system message and an RRC message.

For example, in the embodiments of the present disclosure, the information configured by the first network device is carried in an information element of the configuration message.

For example, in the embodiments of the present disclosure, the information of default setting of the first network device includes at least one of the following:
  whether the first network device supports receiving of the leaving notification message; and
  a UE state in which the first network device allows to send a leaving notification message.

For example, in the embodiments of the present disclosure, the leaving notification message is received through an RRC setup complete message, an RRC reconfiguration complete message, an RRC recovery complete message, UE assistance information, or a NAS message.

The first network device provided in the embodiments of the present disclosure can implement each process performed by the first network device in the above-mentioned embodiment of the state notification method, and can achieve the same technical effect. To avoid repetition, details are not described herein.

An embodiment of the present disclosure provides a first network device. Since the leaving notification configuration information can indicate whether to send a leaving notification message to the first network device, the first network device can send the leaving notification configuration information to the first UE, so that whether to send the leaving notification message to the first network device when the first UE leaves the first network can be flexibly controlled. In this way, the first network device can flexibly control the sending of the leaving notification message according to a network state or scenario of the first network, thereby reducing signaling loads.

Figure 6:
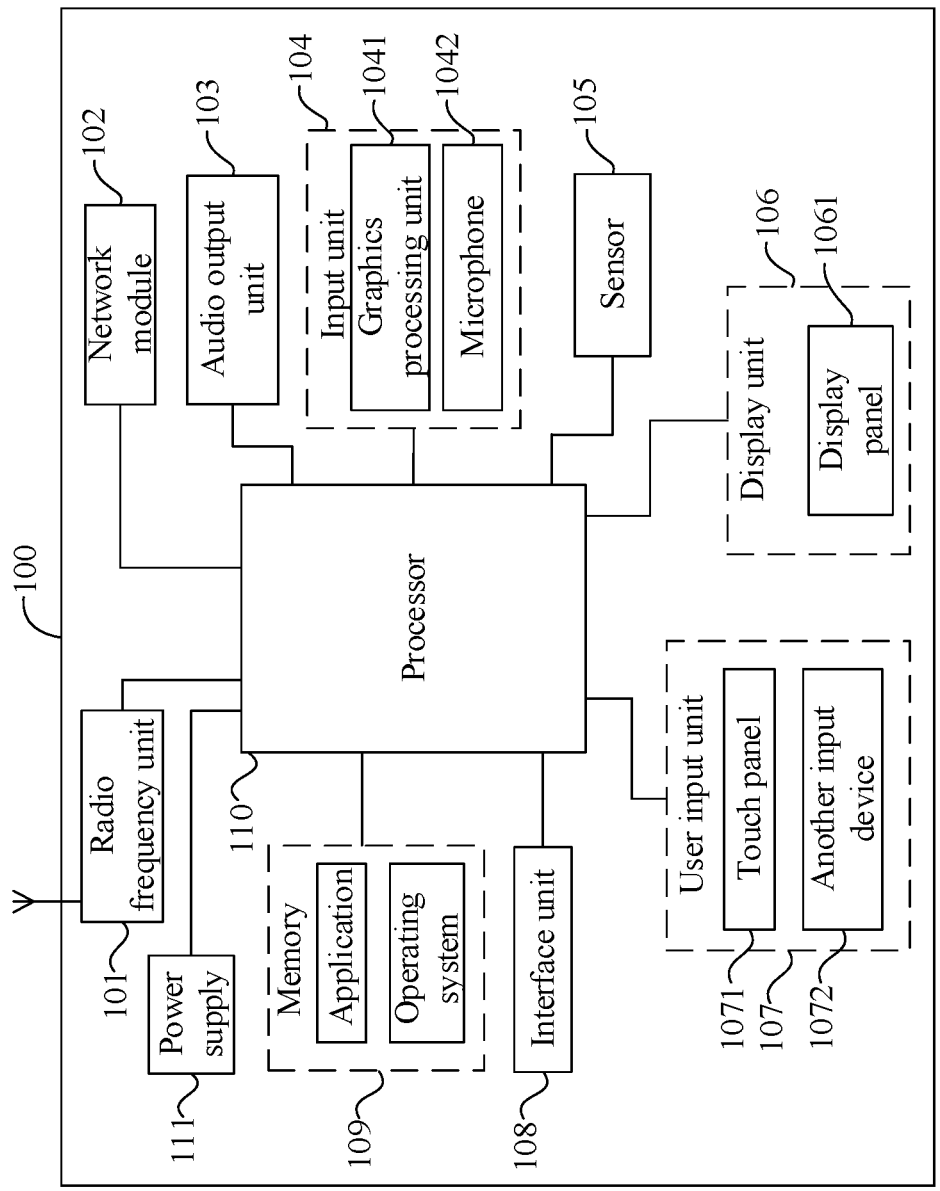
FIG. 6 is a schematic diagram of hardware of UE according to an embodiment of the present disclosure.

FIG. 6 is a schematic hardware diagram of UE (for example, the first UE in the embodiments of the present disclosure) implementing various embodiments of the present disclosure. As shown in FIG. 6, UE 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that a structure of the UE shown in FIG. 6 does not constitute a limitation on the UE, and the UE may include more or fewer components than those shown in the figure, or some components may be combined, or there may be a different component arrangement. In the embodiments of the present disclosure, the UE includes but is not limited to a mobile phone, a tablet computer, a laptop computer, a palmtop computer, an in-vehicle terminal, a wearable device, a pedometer, and the like.

The processor 110 is configured to: before the first UE leaves a first network on which the first UE camps, determine, according to leaving notification configuration information, whether to send a leaving notification message; and the radio frequency unit 101 is configured to: in a case that the processor 110 determines to send a leaving notification message, send a leaving notification message to a first network device, where the leaving notification message is used to indicate that the first UE will leave the first network, and the first network is a network in which the first network device is located.

It can be understood that, in the embodiments of the present disclosure, the determining module 301 in the schematic structural diagram of the foregoing UE (for example, FIG. 4) may be implemented by the foregoing processor 110. The sending module 302 and the receiving module in the schematic structural diagram of the foregoing UE may be implemented by the radio frequency unit 101.

The embodiments of the present disclosure provide UE. On the one hand, before the first UE leaves the first network, the first UE can determine, according to the leaving notification configuration information, whether to send the leaving notification message to the first network device. Therefore, the leaving notification configuration information can indicate whether to send the leaving notification message to the first network device. If the leaving notification configuration information indicates that the leaving notification message is sent to the first network device, the first UE may determine that the first network device receives the leaving notification information sent by the first UE, and then the first UE may send the leaving notification message to the first UE. This can avoid resource waste caused because the first network device does not receive the leaving notification message sent by the first UE. On the other hand, by sending the leaving notification message to the first network device the first UE may notify the first network device that the first UE will leave the first network, so that after the first network device receives the leaving notification message, the first network device can stop service processing for the first UE, and incorrect statistics collection and unnecessary service processing of the first network device can be avoided.

It should be understood that, in the embodiments of the present disclosure, the radio frequency unit 101 may be configured to receive and send information or a signal in a call process. In some embodiments, after receiving downlink data from a base station, the radio frequency unit sends the downlink data to the processor 110 for processing. In addition, the radio frequency unit sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The UE 100 provides the user with wireless broadband Internet access by using the network module 102, for example, helps the user send or receive an email, browse a web page, and access streaming media.

The audio output unit 103 may convert audio data received by the radio frequency unit 101 or the network module 102 or stored in the memory 109 into an audio signal and output the audio signal as a sound. In addition, the audio output unit 103 may also provide audio output (for example, call signal receiving sound or message receiving sound) related to a specific function performed by the UE 100. The audio output unit 103 includes a speaker, a buzzer, a telephone receiver, and the like.

The input unit 104 is configured to receive an audio signal or a video signal. The input unit 104 may include a Graphics Processing Unit (GPU) 1041 and a microphone 1042. The graphics processing unit 1041 processes image data of a static picture or a video obtained by an image capturing apparatus (for example, a camera) in an image capturing mode or a video capturing mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 may receive a sound and can process such sound into audio data. The audio data obtained through processing may be converted, in a telephone call mode, into a format that can be sent to a mobile communications base station via the radio frequency unit 101 for output.

The UE 100 further includes at least one sensor 105, for example, a light sensor, a motion sensor, and another sensor. In some embodiments, the light sensor includes an ambient light sensor and a proximity sensor. The ambient light sensor may adjust luminance of the display panel 1061 based on brightness of ambient light. The proximity sensor may turn off the display panel 1061 and/or backlight when the UE 100 is moved to an ear. As a type of the motion sensor, an accelerometer sensor may detect an acceleration value in each direction (generally, three axes), and detect a value and a direction of gravity when the accelerometer sensor is static, and may be used in an application for recognizing a posture of the UE 100 (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include the display panel 1061, and the display panel 1061 may be configured in a form of a Liquid Crystal Display (LCD), an Organic Light-Emitting Diode (OLED), or the like.

The user input unit 107 may be configured to receive input digit or character information, and generate a key signal input related to user setting and function control of the UE 100. In some embodiments, the user input unit 107 includes a touch panel 1071 and another input device 1072. The touch panel 1071 is also referred to as a touchscreen, and may collect a touch operation performed by a user on or near the touch panel 1071 (for example, an operation performed by a user on the touch panel 1071 or near the touch panel 1071 by using any proper object or accessory, for example, a finger or a stylus). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 110, and receives and executes a command sent by the processor 110. In addition, the touch panel 1071 may be implemented in various types such as a resistor, a capacitor, an infrared ray, or a surface acoustic wave. In addition to the touch panel 1071, the user input unit 107 may also include another input device 1072. In some embodiments, the another input device 1072 may include, but is not limited to, a physical keyboard, a function key (for example, a volume control key or a switch key), a trackball, a mouse, and a joystick. Details are not described herein again.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 6, the touch panel 1071 and the display panel 1061 act as two separate parts to implement input and output functions of the UE 100, in some embodiments, the touch panel 1071 and the display panel 1061 may be integrated to implement the input and output functions of the UE 100. This is not specifically limited herein.

The interface unit 108 is an interface for connecting an external apparatus to the UE 100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive input (for example, data information and power) from the external apparatus and transmit the received input to one or more elements in the UE 100, or may be configured to transmit data between the UE 100 and the external apparatus.

The memory 109 may be configured to store a software program and various data. The memory 109 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage device, a flash storage device, or another volatile solid-state storage device.

The processor 110 is a control center of the UE 100, and connects all parts of the entire UE 100 by using various interfaces and lines. By running or executing a software program and/or a module stored in the memory 109 and invoking data stored in the memory 109, the processor 110 performs various functions and/or data processing of the UE 100, to perform overall monitoring on the UE 100. The processor 110 may include one or more processing units. For example, the processor 110 may be integrated with an application processor and a modem processor. The application processor mainly processes an operating system, a user interface, an application program, and the like, and the modem processor mainly processes wireless communication. It can be understood that the modem processor may not be integrated into the processor 110.

The UE 100 may further include the power supply 111 (for example, a battery) configured to supply power to various components. For example, the power supply 111 may be logically connected to the processor 110 through a power management system, so as to implement functions such as managing charging, discharging, and power consumption through the power management system.

In addition, the UE 100 includes some function modules not shown. Details are not described herein.

It can be understood that, in the embodiments of the present disclosure, the UE 100 may be the UE 02 in the communications system shown in FIG. 1 in the foregoing embodiment.

For example, an embodiment of the present disclosure further provides UE, including the processor 110 and the memory 109 that are shown in FIG. 6, and a computer program stored in the memory 109 and executable on the processor 110, where the computer program, when executed by the processor 110, implements the processes of the foregoing embodiments of the state notification method, and the same technical effects can be achieved. To avoid repetition, details are not described herein again.

Figure 7:
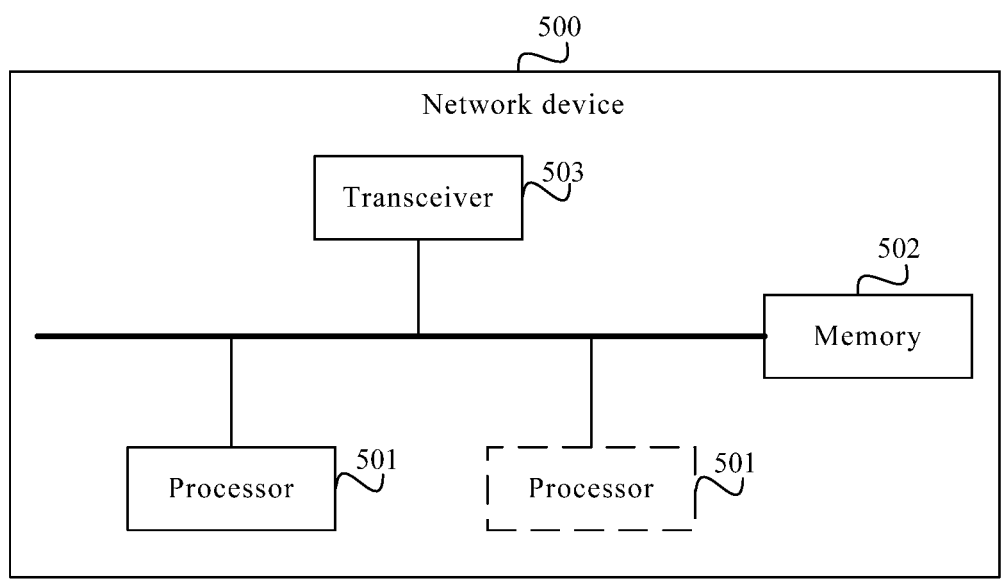
FIG. 7 is a schematic diagram of hardware of a network device according to an embodiment of the present disclosure.

FIG. 7 is a schematic diagram of hardware of a network device (for example, the first network device in the embodiments of the present disclosure) according to an embodiment of the present disclosure. As shown in FIG. 7, the network device 500 may include one or more processors 501, a memory 502, and a transceiver 503.

The transceiver 503 can be configured to send leaving notification configuration information to first UE; and receive a leaving notification message sent by the first UE, where the leaving notification message is used to indicate that the first UE will leave the first network, the first network is a network in which the first network device is located, and the leaving notification configuration information includes at least one of the following: information configured by the first network device and information of default setting of the first network device.

It should be noted that, one of the two processors 501 in FIG. 7 is represented by a dotted line to indicate that the number of the processors 501 in the network device 500 may be one or more. In FIG. 7, the network device 500 includes two processors 501 as an example for illustrative description.

It may be understood that, in the embodiments of the present disclosure, the sending unit 401 and the receiving unit 402 in the schematic structural diagram (for example, FIG. 5) of the above network device can be implemented by the transceiver 503.

An embodiment of the present disclosure provides a network device. Since the leaving notification configuration information can indicate whether to send a leaving notification message to the first network device, the first network device can send the leaving notification configuration information to the first UE, so that whether to send the leaving notification message to the first network device when the first UE leaves the first network can be flexibly controlled. In this way, the first network device can flexibly control the sending of the leaving notification message according to a network state or scenario of the first network, thereby reducing signaling loads.

In an embodiment of the present disclosure, the one or more processors 501, the memory 502, and the transceiver 503 may be connected to each other. The one or more processors 501 may be Building Baseband Units (BBU), which may also be referred to as indoor building baseband unit; and the transceiver 503 may be a Remote Radio Unit (RRU), which may also be referred to as remote transmitter unit. In addition, the network device 500 may further include some function modules not shown, and details are not described herein again.

It can be understood that, in the embodiments of the present disclosure, the network device 500 may be the network device 01 in the communications system shown in FIG. 1 in the foregoing embodiment.

For example, the embodiments of the present disclosure further provide a network device, including a processor 501 shown in FIG. 7, a memory 502, and a computer program stored in the memory 502 and executable on the processor 501. When the computer program is executed by the processor 501, the processes of the foregoing method embodiment are implemented, and a same technical effect can be achieved. To avoid repetition, details are not described herein again.

An embodiment of the present disclosure further provides a computer readable storage medium. The computer readable storage medium stores a computer program. When the computer program is executed by the processor 110 shown in FIG. 6 or the processor 501 shown in FIG. 7, processes of the foregoing method embodiment are implemented, and a same technical effect can be achieved. To avoid repetition, details are not described herein again. The computer-readable storage medium may include a Read-Only Memory (ROM), a Random Access Memory (RAM), a magnetic disk, an optical disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, an air conditioner, a network device, or the like) to perform the method described in the embodiments of this application.

The embodiments of this application are described above with reference to the accompanying drawings, but this application is not limited to the foregoing implementations. The foregoing implementations are merely schematic instead of restrictive. Under enlightenment of this application, a person of ordinary skills in the art may make many forms without departing from aims of this application and the protection scope of claims, all of which fall within the protection of this application.

The invention claimed is:

1. A state notification method, performed by a first User Equipment (UE) of a terminal device, wherein the terminal device further comprises a second UE, comprising:
   before the first UE in a Radio Resource Control (RRC) connected state leaves a first network, determining, according to leaving notification configuration information, whether to send a UE assistance information message, wherein the leaving notification configuration information is used to indicate the first UE whether to send the UE assistance information message to a first network device; and
   when determining to send the UE assistance information message, sending the UE assistance information message to the first network device, wherein the UE assistance information message comprises information used to indicate that the first UE will leave the first network, and the first network is a network in which the first network device is located and corresponds to the first UE.

2. The state notification method according to claim 1, wherein the leaving notification configuration information comprises at least one of the following:
   information configured by the first network device;
   acquired information of default setting of the first network device; or
   predefined information.

3. The state notification method according to claim 2, wherein the information configured by the first network device comprises at least one of the following:
   whether the first network device supports receiving of the UE assistance information;
   a UE state in which the first network device allows to send a UE assistance information;
   a triggering condition in which the first network device allows to send a UE assistance information message; or
   indication information, wherein the indication information is used to indicate whether the information configured by the first network device is in an active state.

4. The state notification method according to claim 3, wherein the triggering condition in which the first network device allows to send the UE assistance information message comprises at least one of the following:
   the second UE initiating a signaling process;
   the second UE receiving a paging message;
   the second UE establishing a voice service; or
   the second UE transmitting a task;
   wherein the second UE and the first UE are UEs controlled by the terminal device.

5. The state notification method according to claim 2, further comprising:
   receiving leaving notification configuration update information sent by the first network device, wherein the leaving notification configuration update information is used to update the information configured by the first network device.

6. The state notification method according to claim 5, wherein the updating the information configured by the first network device comprises any one of the following:
   activating the information configured by the first network device;
   deactivating the information configured by the first network device;
   modifying the information configured by the first network device;
   activating and modifying the information configured by the first network device; or
   deactivating and modifying the information configured by the first network device.

7. The state notification method according to claim 2, wherein the information configured by the first network device is configured through a configuration message;
   wherein the configuration message comprises at least one of the following: a system message or a RRC message.

8. The state notification method according to claim 2, wherein the information of default setting of the first network device comprises at least one of the following:

whether the first network device supports receiving of the UE assistance information message; or a UE state in which the first network device allows to send a UE assistance information.

9. The state notification method according to claim 2, wherein the predefined information comprises at least one of the following:
a state of UE allowed by the network device to send a UE assistance information message;
the UE determining whether the network device supports receiving of a UE assistance information message; or
the network device not supporting receiving of a UE assistance information message.

10. A state notification method, performed by a first network device, comprising:
sending leaving notification configuration information to a first User Equipment (UE) of a terminal device, wherein the terminal device further comprises a second UE; and
receiving a UE assistance information message sent by the first UE, wherein the UE assistance information message comprises information used to indicate that the first UE in a Radio Resource Control (RRC) connected state will leave the first network, and the first network is a network in which the first network device is located and corresponds to the first UE,
wherein the leaving notification configuration information is used to indicate the first UE whether to send the UE assistance information message to a first network device,
wherein the leaving notification configuration information comprises at least one of the following: information configured by the first network device or information of default setting of the first network device.

11. The state notification method according to claim 10, wherein the information configured by the first network device comprises at least one of the following:
whether the first network device supports receiving of the UE assistance information message;
a UE state in which the first network device allows to send a UE assistance information message;
a triggering condition in which the first network device allows to send a UE assistance information message; or
indication information, wherein the indication information is used to indicate whether the information configured by the first network device is in an active state.

12. The state notification method according to claim 11, wherein the triggering condition in which the first network device allows to send the UE assistance information message comprises at least one of the following:
the second UE initiating a signaling process;
the second UE receiving the paging message;
the second UE establishing a voice service; or
the second UE transmitting a task;
wherein the second UE and the first UE are UEs controlled by the terminal device.

13. The state notification method according to claim 10, further comprising:
sending leaving notification configuration update information to the first UE, wherein the leaving notification configuration update information is used to update the information configured by the first network device.

14. The state notification method according to claim 13, wherein the updating the information configured by the first network device comprises any one of the following:
activating the information configured by the first network device;
deactivating the information configured by the first network device;
modifying the information configured by the first network device;
activating and modifying the information configured by the first network device; or
deactivating and modifying the information configured by the first network device.

15. The state notification method according to claim 10, wherein the information configured by the first network device is configured through a configuration message;
wherein the configuration message comprises at least one of the following: a system message or a RRC message.

16. The state notification method according to claim 10, wherein the information of default setting of the first network device comprises at least one of the following:
whether the first network device supports receiving of the UE assistance information message; or
a UE state in which the first network device allows to send a UE assistance information.

17. A terminal device, comprising a first User Equipment (UE) and a second UE, wherein the first UE comprises a memory having a computer program stored thereon, and a processor, wherein the computer program, when executed by the processor, causes the processor to perform operations comprising:
before the first UE in a Radio Resource Control (RRC) connected state leaves a first network, determining, according to leaving notification configuration information, whether to send a UE assistance information message, wherein the leaving notification configuration information is used to indicate the first UE whether to send the UE assistance information message to a first network device; and
when determining to send the UE assistance information message, configuring a radio frequency unit to send the UE assistance information message to the first network device, wherein the UE assistance information message comprises information used to indicate that the first UE will leave the first network, and the first network is a network in which the first network device is located and corresponds to the first UE.

18. The UE according to claim 17, wherein the leaving notification configuration information comprises at least one of the following:
information configured by the first network device;
acquired information of default setting of the first network device; or
predefined information.

* * * * *